H. F. FOWLES.
DETACHABLE HANDLE FOR CROCKERY.
APPLICATION FILED SEPT. 24, 1907.

904,417.

Patented Nov. 17, 1908.

Witnesses
Frank B. Hoffman

Inventor
Henry F. Fowles
By Victor J. Evans
Attorney

UNITED STATES PATENT OFFICE.

HENRY FRANCIS FOWLES, OF SPOKANE, WASHINGTON.

DETACHABLE HANDLE FOR CROCKERY.

No. 904,417.

Specification of Letters Patent.

Patented Nov. 17, 1908.

Application filed September 24, 1907. Serial No. 394,404.

*To all whom it may concern:*

Be it known that I, HENRY F. FOWLES, a citizen of the United States, residing at Spokane, in the county of Spokane and State of Washington, have invented new and useful Improvements in Detachable Handles for Crockery, of which the following is a specification.

This invention relates to detachable handles for crockery or glass vessels and one of the principal objects of the same is to provide a cup or other vessel with a knob projecting from the side thereof and to provide a metal handle which can be quickly attached to the knob and detached therefrom whenever required.

Another object of the invention is to provide a metal handle which can be quickly connected to a glass vessel and which will be firmly connected thereto and readily disconnected therefrom and which will not detract from the general appearance of the vessel.

These and other objects may be attained by means of the construction illustrated in the accompanying drawing, in which:—

Figure 1:
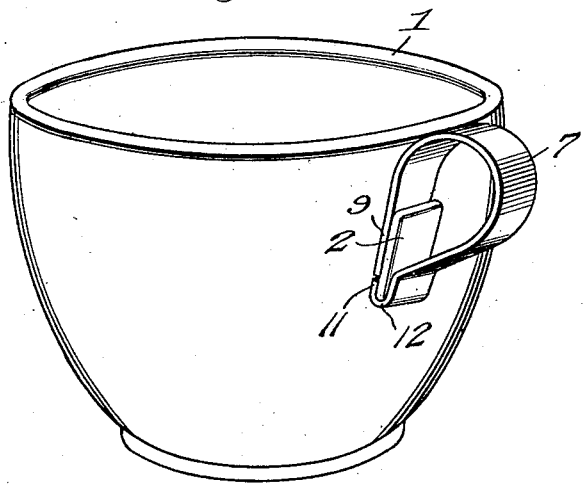
Figure 2:
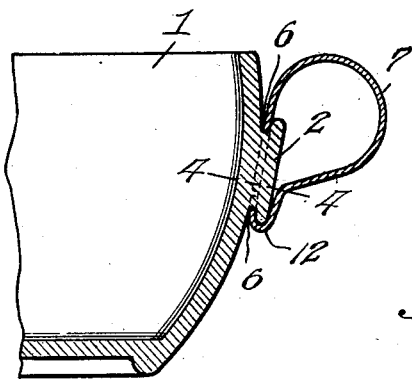
Figure 3:
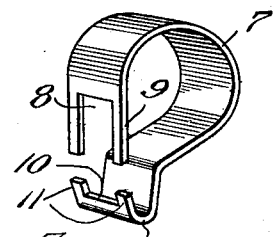
Figure 4:
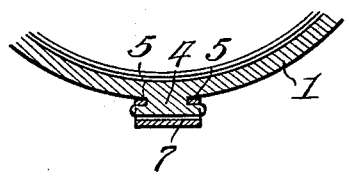

Figure 1 is a perspective view of a cup or bowl having a detachable handle made in accordance with my invention. Fig. 2 is a central vertical section taken through the vessel, the handle and the knob. Fig. 3 is a perspective view of the handle detached from the cup. Fig. 4 is a sectional view on the line 4—4 of Fig. 2.

Referring to the drawing for a more specific description of my invention, the numeral 1 designates a cup, bowl or similar vessel provided on its side with an integral knob 2, said knob being preferably rectangular in form. The projecting knob 2 is connected to the body of the cup or bowl 1 by a rectangular shank 4 formed integral with the cup and knob and provided with side grooves 5 and upper and lower grooves 6.

The detachable handle 7 is made from a single piece of sheet metal bent into the proper shape to form a finger or hand hold and provided with a recess 8 and oppositely spaced lugs 9 at one end of said handle, while the opposite end of said handle is also provided with a shallow recess 10 and short projecting lugs 11. To connect the handle 7 with the vessel 1, the lugs 9 are inserted upon opposite sides of the shank 4 said lugs 9 occupying the grooves 5 upon opposite sides of the projection 2. The lower part of the handle is then bent downward until the lugs 11 occupy the lower portions of the grooves 5 with the curved portion 12 of said handle engaging the projecting knob, as shown more particularly in Fig. 2. To detach the handle, the lugs 11 are withdrawn and pulled outward until the lugs 9 are in position to be withdrawn.

From the foregoing it will be obvious that a handle made in accordance with my invention can be quickly attached to and detached from the knob at the side of the vessel and when attached does not detract from the general appearance of the vessel, the side edges of the handle lying substantially flush with the knob 2.

Having thus described the invention, what is claimed as new, is:—

In a device of the class described, a vessel provided with a handle attaching leg having grooves formed in its side, upper and lower edges, a handle having a portion at its lower end curved inwardly and upwardly, spaced lugs carried by the upwardly curved portion for engagement in the grooves at the sides of said lug adjacent to the lower end thereof, said handle having a portion at its upper end curved inwardly and downwardly, and spaced lugs carried by the downwardly extending portion and engaged in the grooves at the sides of the lug, and disposed above the first named lugs.

In testimony whereof I affix my signature in presence of two witnesses.

HENRY FRANCIS FOWLES.

Witnesses:
S. T. JORDAN,
D. HALL.